United States Patent [19]

Carlomagno et al.

[11] 4,034,450

[45] July 12, 1977

[54] MARKER SLEEVE INSTALLATION

[75] Inventors: William Dominac Carlomagno, Redwood City; Stephen Hunter Diaz, Los Altos, both of Calif.

[73] Assignee: Raychem Corporation, Menlo Park, Calif.

[21] Appl. No.: 577,731

[22] Filed: May 15, 1975

[51] Int. Cl.$^2$ .......... B23P 19/00

[52] U.S. Cl. .......... 29/33 E; 29/33 M; 29/745; 425/393

[58] Field of Search .......... 29/33 E, 33 M, 203 R, 29/203 MW, 234, 282, 525; 72/176; 425/392, 393, 395, 396, 403, 336, 142, 297; 83/580

[56] References Cited

U.S. PATENT DOCUMENTS

| | | | |
|---|---|---|---|
| 2,177,231 | 10/1939 | Tinnerman | 29/282 |
| 2,438,023 | 3/1948 | Sirp | 29/33 E |
| 2,516,687 | 7/1950 | Eckstein | 29/33 E X |
| 3,001,569 | 9/1961 | Graot | 72/176 X |
| 3,025,562 | 3/1962 | Nelson | 425/296 X |
| 3,231,937 | 2/1966 | Lurie | 425/393 X |
| 3,376,627 | 4/1968 | Sitz | 29/203 R |
| 3,382,533 | 5/1968 | Fyfe et al. | 425/142 X |
| 3,461,532 | 8/1969 | Lybarger | 29/203 R |
| 3,765,084 | 10/1973 | Kent | 29/203 R X |
| 3,781,985 | 3/1973 | Yonkers | 29/203 R X |

FOREIGN PATENT DOCUMENTS

| | | | |
|---|---|---|---|
| 200,373 | 8/1955 | Australia | 425/393 |
| 410,092 | 10/1966 | Switzerland | 29/33 E |

*Primary Examiner*—Richard B. Lazarus

*Assistant Examiner*—William R. Briggs

*Attorney, Agent, or Firm*—Lyon & Lyon

[57] ABSTRACT

An apparatus for the facile installation of non-cylindrical marker sleeves on wire-like members such as electrical wiring or cable. The apparatus is particularly directed to the handling of non-cylindrical marker sleeves which are tightly and slidably arranged on fingers of a carrier belt. A stripper mechanism employing a series of split tines is slidably positioned on a base capable of fixedly holding the carrier belt and fingers. The split tines are directed along either side of each finger to engage a first end of each non-cylindrical sleeve and to force the sleeve from its supporting finger. A die is fixed to the base to receive the sleeves as they are stripped from the carrier fingers. The die includes a plurality of formed channels which receive the non-cylindrical sleeves and force them into a substantially cylindrical configuration as they are stripped into respective channels. If the stripper mechanism does not force the sleeves entirely off the carrier fingers, a knife may be passed between the ends of the fingers and the die to sever the unstripped portions of the sleeves. The die holds the stripped portions of the sleeves in place and in a substantially cylindrical configuration in order that wire-like members may be passed through the sleeves unresisted. The wire-like member and sleeve assemblies may then be lifted from the channels and the sleeve easily positioned where desired. Subsequent portions of the severed sleeves or a new set of sleeves may then be stripped into the again vacant die.

8 Claims, 14 Drawing Figures

FIG. 4
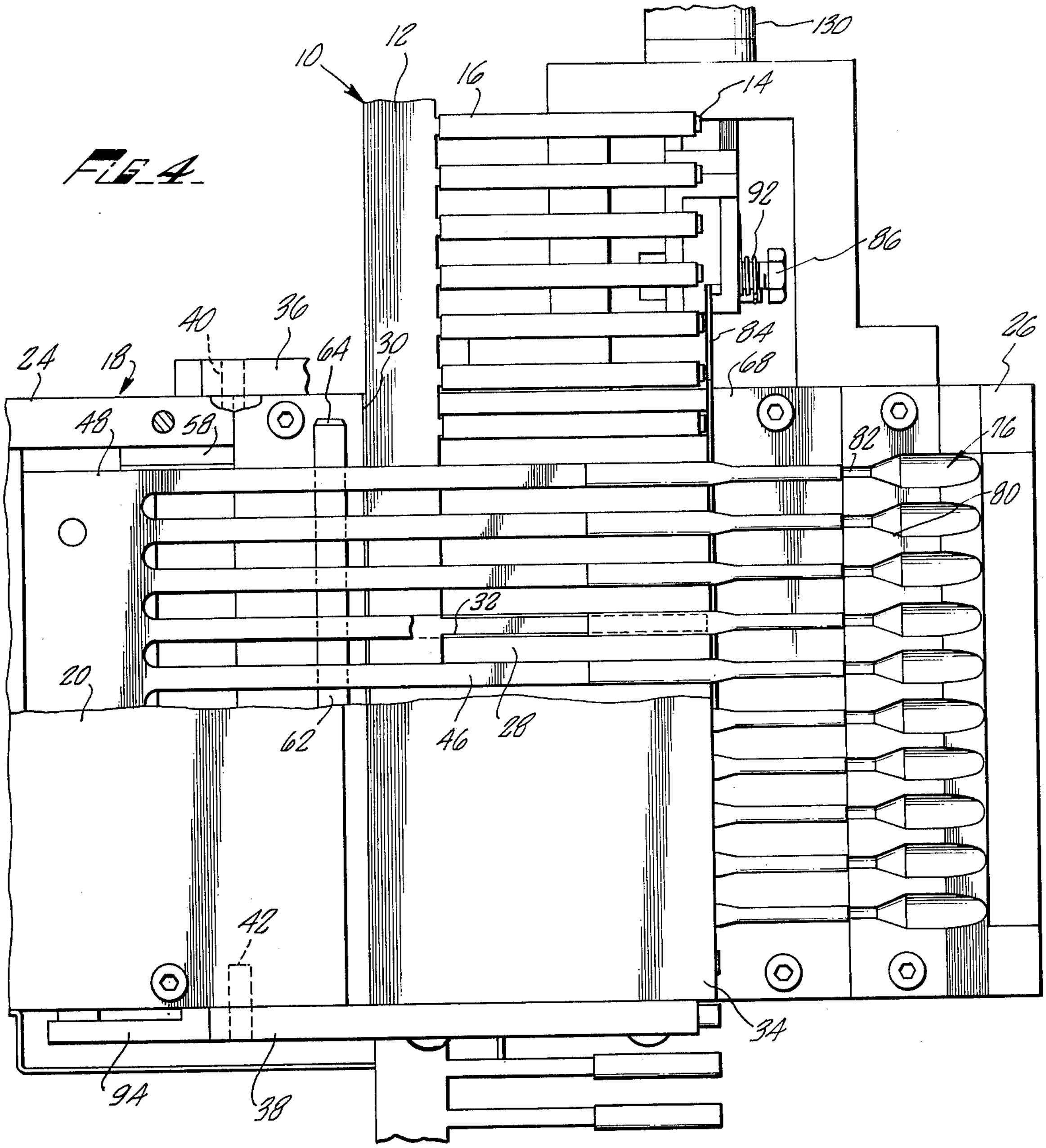
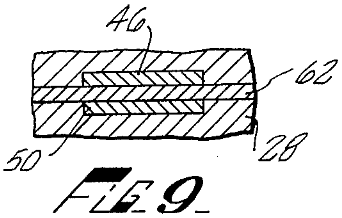
FIG. 9
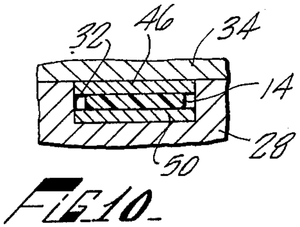
FIG. 10
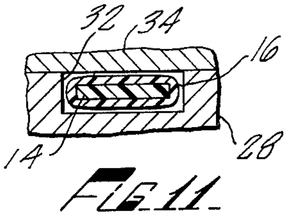
FIG. 11
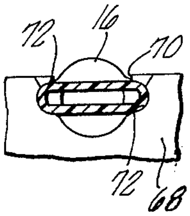
FIG. 12
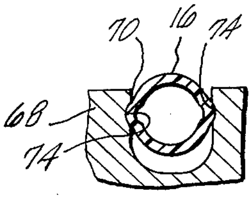
FIG. 13

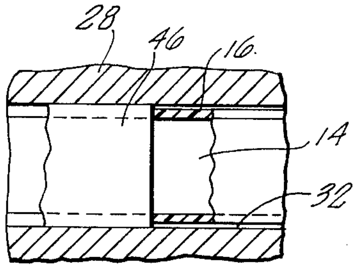
FIG. 8
FIG. 6
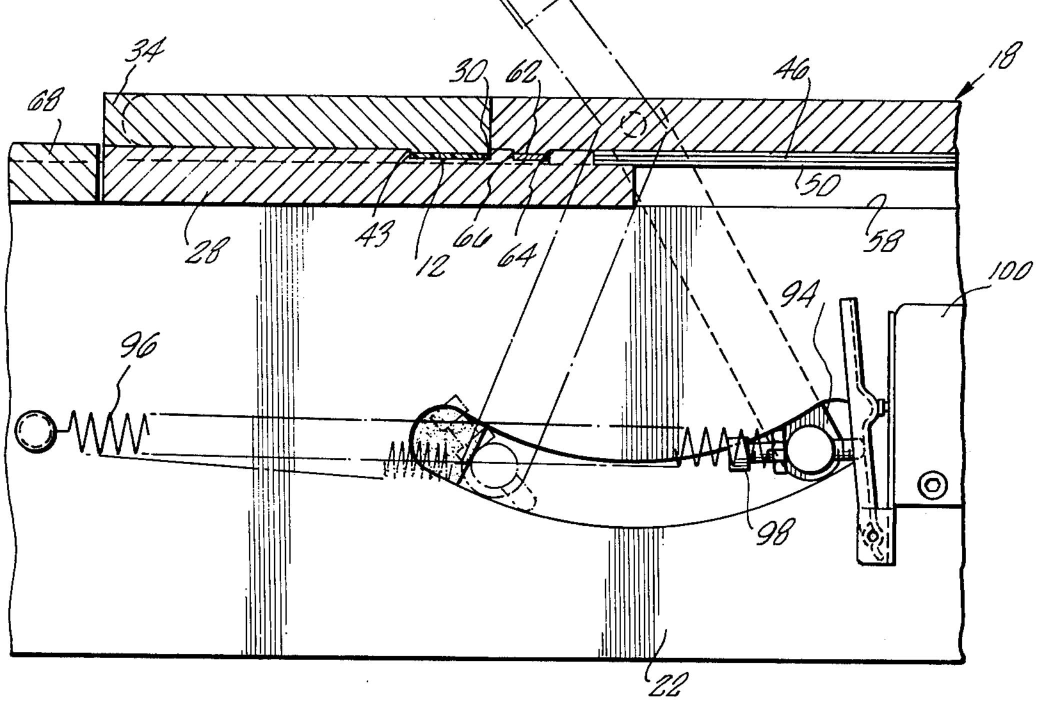
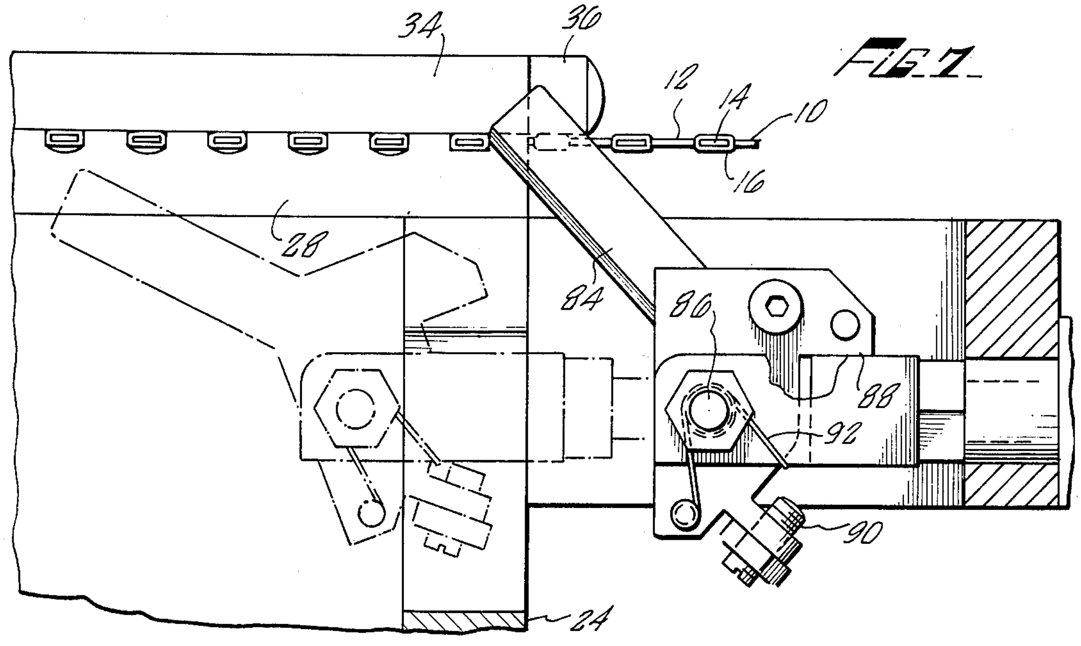
FIG. 7

MARKER SLEEVE INSTALLATION

BACKGROUND OF THE INVENTION

The present invention is directed to a mechanism for the placement of marker sleeves on wire-like members. More specifically the present invention is directed to a mechanism for stripping non-cylindrical sleeves from a carrier belt on which the sleeves are tightly and slidably arranged and forcibly holding these sleeves in a substantially cylindrical configuration for the facile insertion of wire-like members through the sleeves.

With the advent of highly sophisticated and correspondingly complex electrical and electronic systems, a need has arisen for the detailed labeling of the individual wires and cables present in such a system to aid in assembly, repair and/or subsequent alteration of the electrical or electronic device. As a result of this need, marker sleeves have been developed which are either color coded or include printed indicia for identification of a specific conductor. These sleeves are then positioned over the conductor and held by a variety of known methods. Naturally the placement of such sleeves constitutes an additional step in the fabrication of the electrical or electronic component. Consequently, it is of benefit to facilitate the placement of such sleeves to reduce the cost of incorporating such convenient and often necessary marking systems.

Because of the large number of marker sleeves necessary in any complex electrical or electronic system and because of the variety of distinguishing markings required of such sleeves, it has been found advantageous to load unmarked sleeves onto fingers extending from a continuous carrier belt. The sleeves are of heat recoverable material and may conveniently be positioned on the fingers in an expanded cylindrical shape. The sleeves are then at least partially heat recovered so thay they are tightly and slidably arranged on the fingers. The heat recovery causes the sleeves to acquire a non-cylindrical shape such that printed indicia may be placed on these sleeves in a relatively continuous manner. Such a system is disclosed in Evans et al, MARKER ASSEMBLY AND METHOD, U.S. Pat. application Ser. No. 369,836, now U.S. Pat. No. 3,894,731, assigned to the assignee of the present invention, the disclosure of which is incorporated herein by reference.

In spite of the obvious advantages in the handling and marking of such sleeves mounted on a continuous carrier, it remains that the sleeves must be removed from the supporting fingers and finally positioned on wire-like members. It is advantageous that such removal and positioning be accomplished in an easy and rapid manner to obtain maximum benefit from such a system at minimum cost.

SUMMARY OF THE INVENTION

The present invention is directed to an apparatus for the rapid and facile placement of non-cylindrical marker sleeves on wires, cables and other wire-like members. The present apparatus strips non-cylindrical marker sleeves from carrier belt fingers and simultaneously deforms the stripped sleeve into a substantially cylindrical configuration. In this way, wire-like members may be threaded through the marker sleeves without further manipulation of the sleeve. As the apparatus handles a plurality of such sleeves at one time, the utility of the present system is further enhanced. The simultaneous stripping and distorting of the sleeves are accomplished by the forced motion of tines through narrow guideways in which carrier belt fingers are positioned with sleeves arranged thereon. The tines strip the sleeves from the fingers by pushing the sleeves from one end. As the sleeves move from the fingers, they enter an adjacent die. The die includes channels divided into a transition zone and a holding zone. The transition zone is located along one side of the die adjacent the aforementioned guideways. The non-circular sleeves are received and forced into a substantially cylindrical configuration in the transition zone. The second holding zone forces the entering sleeves to remain in the substantially cylindrical configuration.

If the marker sleeves are longer than required, the excess may be trimmed by a knife which can pass between the ends of the carrier finger guideways and the die. The sleeves remain in the die and wire-like members may be inserted from the other end of the die through each individual sleeve without further manipulation of the sleeves. Each member and sleeve assembly may then be lifted laterally from its respective channel in the die and the sleeve passed along the member to its appropriate position. Further heat recovery or other means may then be used to fix the assembled marker sleeves in place.

Where relatively short identification sleeves are required, each sleeve member loaded on the carrier belt may be used to make a number of sleeves. This is accomplished by controlling the stripping operation to strip only a portion of the sleeves from the fingers. A knife may then be used to cut the sleeve portions to the proper length. A succeeding sleeve portion is then available to be stripped and forced into the die from each carrier finger.

Thus, a device is provided for simultaneously stripping marker sleeves from carrier belt fingers and forcing these sleeves into a substantially cylindrical configuration for easy assembly of the sleeve on wire-like members. In this way, marker sleeves which may be easily marked and handled through the use of a convenient carrier belt, may be easily, conveniently and quickly prepared and positioned for facile assembly with wire-like members as well.

Accordingly, it is an object of the present invention to provide an apparatus for facilitating the assembly of marker sleeves on wire-like members.

It is a further object of the present invention to provide an apparatus for facilitating the installation of noncylindrical marker sleeves on wire-like members, the sleeves being tightly and slidably arranged on fingers extending from a carrier belt.

It is another object of the present invention to provide a die for receiving non-cylindrical marker sleeves, forcing the sleeves into a substantially cylindrical configuration, retaining the sleeves in the die for facile insertion of wire-like members, and allowing the assembled wire-like members and sleeves to be forced laterally from the die.

Other and further objects and advantages will appear hereinafter.

BRIEF DESCRIPTION OF THE DRAWINGS

FIG. 4 is a detailed plan view of the present invention.

FIG. 6 is a cross-sectional elevation taken along line 6—6 of FIG. 1.

FIG. 7 is a cross-sectional elevation taken along line 7—7 of FIG. 3.

FIG. 8 is a cross-sectional detail taken along line 8—8 of FIG. 5.

FIG. 9 is a cross-sectional detail taken along line 9—9 of FIG. 5.

FIG. 10 is a cross-sectional detail taken along line 10—10 of FIG. 5.

FIG. 11 is a cross-sectional detail taken along line 11—11 of FIG. 5.

FIG. 12 is a cross-sectional detail taken along line 12—12 of FIG. 5.

FIG. 13 is a cross-sectional detail taken along line 13—13 of FIG. 5.

DETAILED DESCRIPTION OF THE DRAWINGS

Figure 1:
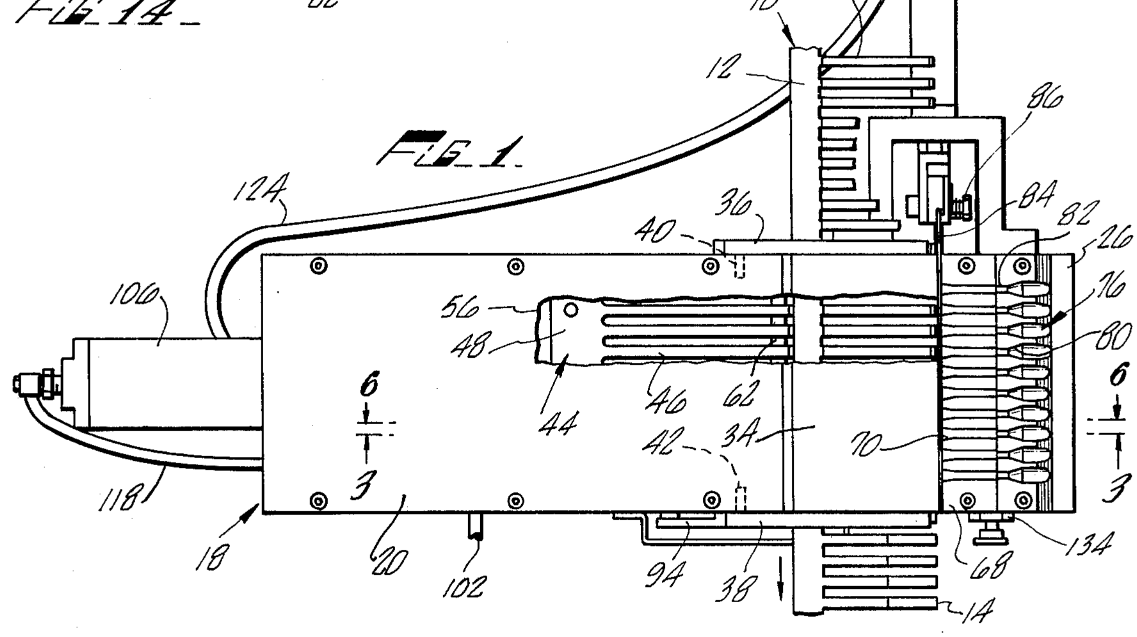
FIG. 1 is a plan view of the present invention with a portion of the upper assembly broken away for clarity.
Figure 2:
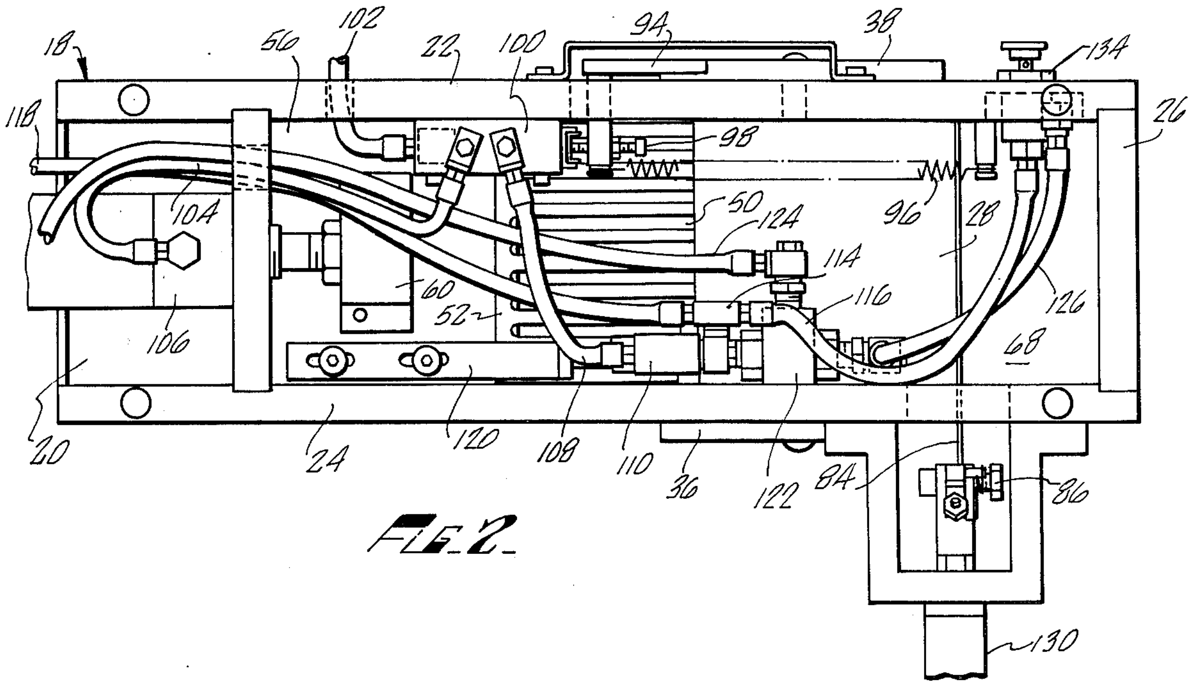
FIG. 2 is a bottom view of the present invention.
Figure 3:
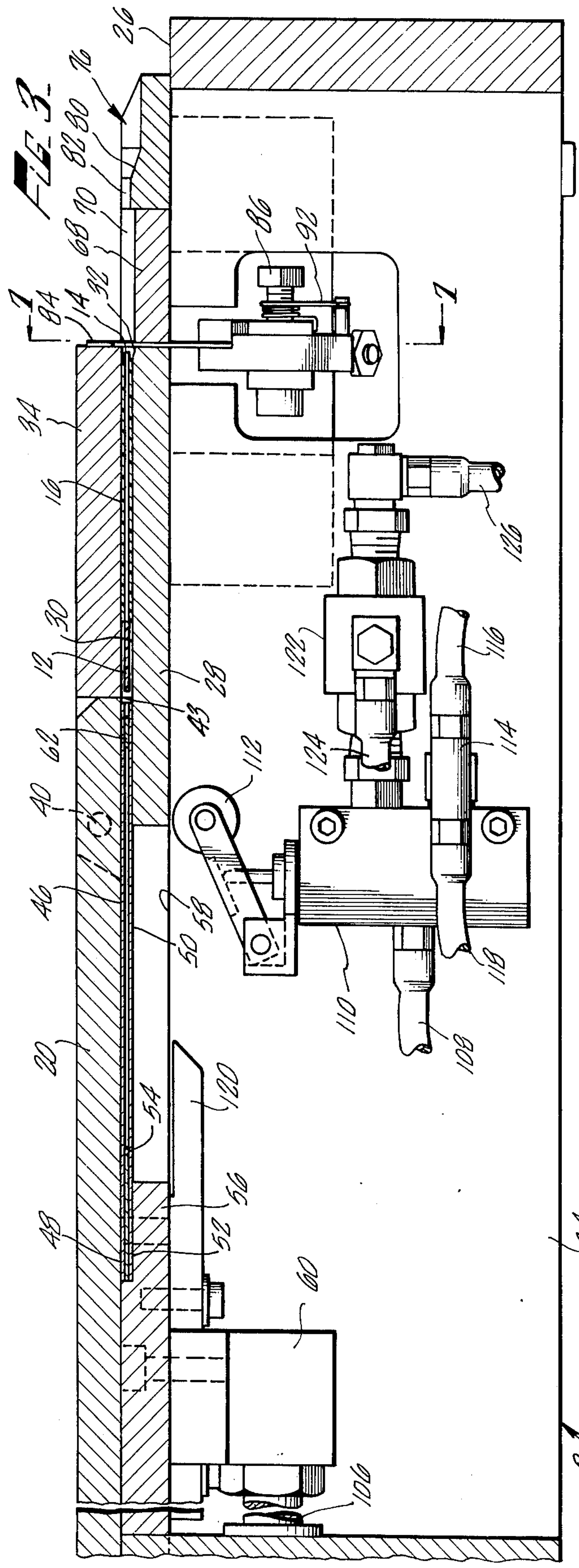
FIG. 3 is a cross-sectional elevation of the present invention taken along line 3—3 of FIG. 1.
Figure 5:
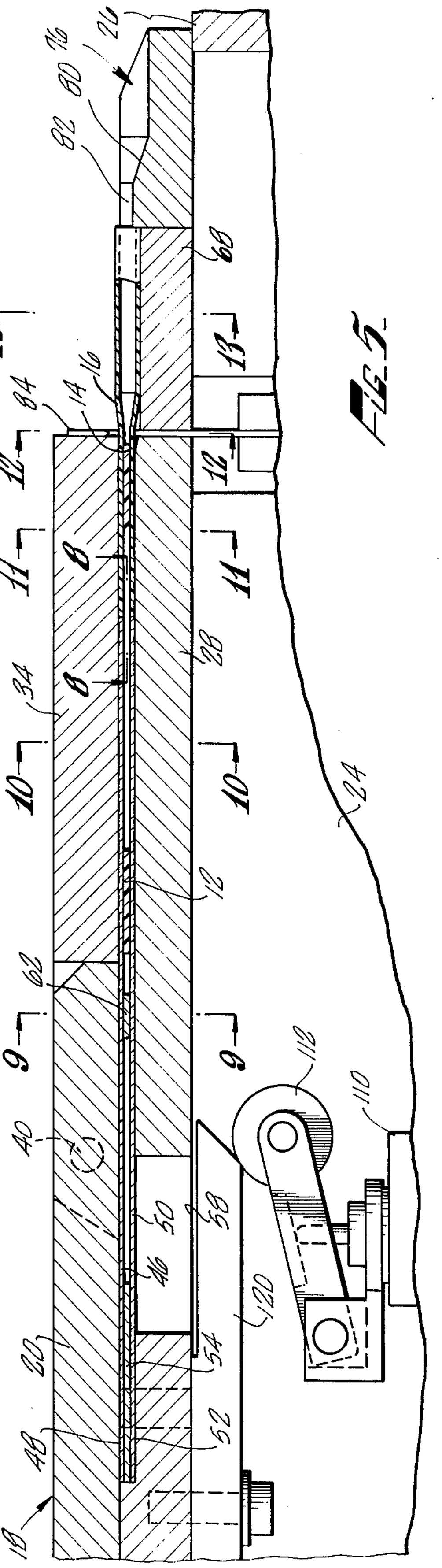
FIG. 5 is a cross-sectional elevation taken along line 3—3 of FIG. 1 with the marker sleeve forced into the die.

Turning in detail to the drawings, a carrier belt 10 is shown in place on the present invention in FIG. 1. The carrier belt 10 includes a continuous band 12 with integral fingers 14 uniformly spaced and extending from one side of the continuous band 12. The carrier belt 10 is usually made of a flat sheet of plastic material such as nylon. Marker sleeves 16 are tightly and slidably positioned on the integral fingers 14. The marker sleeves 16 assume a non-circular configuration as they tightly fit about the relatively flat integral fingers 14. A carrier belt 10 along with associated marker sleeves 16 are more fully disclosed in Evans et al, MARKER ASSEMBLY AND METHOD, U.S. Pat. application Ser. No. 369,836 now U.S. Pat. No. 3,894,731. As may be readily appreciated from the following disclosure, the carrier belt 10 as well as the marker sleeves 16 may be any of a wide variety of embodiments for which the present machine may be adapted without departing from the inventive concepts herein described. For the purpose of the present disclosure, the carrier belt 10 has a continuous band 12 that is 1.27 centimeters (0.5 in.) in width. The integral fingers 14 are 5.08 centimeters (2 in.) long and have a pitch of 0.914 centimeters (0.36 in.). The sleeves 16 are 3.17 centimeters (1.25 in.) long and have an inside dimension of 0.238 centimeters (0.094 in.) when forced into a cylindrical configuration.

The installation apparatus includes a base, generally designated 18. The base 18 is conveniently in the shape of a box having a top 20, sides 22 and 24 and a front 26. These pieces may be conveniently bolted together as shown and may take on other configurations where appropriate. The top 20 extends over only the back upper portion of the base 18. A guideway plate 28 extends forward from below one end of the top 20 to cover a second portion of the base 18. A die assembly extends forward from the guideway plate 28 to the front 26.

The guideway plate 28 includes a carrier band guideway 30 which extends across the width of the guideway plate 28 to receive the continuous band 12 of the carrier belt 10. This band guideway 30 is deep enough to receive the continuous band 12. Running perpendicular to the first guideway 30 is a plurality of finger guideways 32. Twelve such finger guideways 32 are cut into the surface of the guideway plate 28. The finger guideways 32 are spaced to accommodate the carrier belt 10 with the integral fingers 14 spaced at a constant pitch and each extends from near the back of the guideway plate 28 behind the band guideway 30 to the front edge of the guideway plate 28. Thus, marker sleeves 16 may be forced from the fingers 14 out of the front end of the guideway plate 28. The finger guideways 32 are cut deep enough to accommodate the integral fingers 14 and the stripper tines as will be more fully discussed below. The finger guideways 32 are thus deeper than the band guideway 30.

The band guideway 30 and the finger guideways 32 may be covered to form an enclosed system of guideways by a cover plate 34. The cover plate 34 is pivotally mounted to the top 20 by arms 36 and 38 which are rigidly held to the sides of the cover plate 34. The arms 36 and 38 extend rearwardly to pins 40 and 42 which extend into receiving holes in the top 20. In this way, the cover plate 34 may be pivoted up as shown in phantom in FIG. 6 for placement or removal of the carrier belt 10.

With the cover plate 34 in the up position, a new section of carrier belt 10 may be positioned such that the continuous band 12 runs through the band guideway 30. The integral fingers 14 and marker sleeves 16 extend down the finger guideways 32. With the carrier belt 10 in place, the cover plate 34 may be closed to cover the carrier belt 10, the band guideway 30 and the finger guideways 32.

The lower surface of the cover plate 34 is preferably flat forward of the band guideway 30 such that a fixed clearance is provided in each of the finger guideways 32. Above the band guideway 30, a ridge 43 extends across the under surface of the cover plate 34. This ridge 43 is interrupted by small channels corresponding to the finger guideways 32 in the guideway plate 28 below. The ridge 43 where it is not so interrupted, extends to grip the carrier band 12 in cooperation with the floor of the band guideway 30 between the finger guideways 32. Thus, the carrier band 12 is held from sliding forward by the forward wall of the band guideway 30. Further, the band 12 extends across the finger guideways 32 midway between the lower surface of the finger guideways 32 on the guideway plate 28 and the upper surface of the finger guideways 32 on the cover plate 34. This midway positioning is accomplished by the clamping of the band 12 by the ridge 43 and the band guideway floor.

Stripper means are provided beneath the top 20 and communicate with the series of guideways such that the marker sleeves 16 may be forced from the integral fingers 14 and out of the finger guideways 32. The stripper means in the preferred embodiment include a stripper assembly generally designated 44 having a series of upper tines 46 extending from and integrally formed with an upper stripper base member 48 and lower tines 50 similarly associated with a lower stripper base member 52. The upper and lower stripper base members 48 and 52 are rigidly fixed together in parallel relationship with a stripper base spacer 54. As the upper tines 46 and the lower tines 50 are identically formed and the upper and lower stripper base members 48 and 52 are disposed in parallel relationship on either side of the stripper base spacer 54, the upper tines 46 and lower tines 50 extend parallel to one another with each upper tine having a corresponding lower tine directly below.

The stripper assembly 44 is mounted on a carriage block 56 which is slidably held on the base 18. A channel 58 is provided in each sidewall 22 and 24 to receive the outermost portions of the carriage block 56. The top 20 forms the upper side of the channels 58 to insure that the carriage block 56 and in turn the stripper assembly 44 will be constrained to move along a straight line relative to the base 18. Attached to the underside of the carriage block 56 is a thrust block 60 through which a driving means may force the carriage block 56 and accordingly the stripper assembly 44 in either direction along the channels 58.

To insure that the tines 46 and 50 remain mutually parallel and spaced from one another, a spacer bar 62 extends between the tines 46 and 50 behind the band guideway 30 in a channel 64 cut across the guideway plate 28. The channel 64 is not as deep as the perpendicularly running finger guideways 32. Consequently, the spacer bar 62 provides, with the finger guideways 32, narrow passageways allowing directed sliding movement of the lower tines 50 therethrough, see FIG. 9. A ridge 66 runs across the lower side of the top 20 and fits into the channel 64 in the guideway plate 28. In a manner similar to that of ridge 43, the ridge 66 is interrupted by small channels corresponding to the finger guideways 32 and the guideway plate 28 below. The channels in the ridge 66 along with the spacer bar 62 form narrow passageways for the upper tines 46 similar to the narrow passageways formed on the lower side of the spacer bar 62.

The narrow passageways formed both above and below the spacer bar 62 prevent the tines 46 and 50 from becoming misaligned relative to the guideway plate 28. The carriage block 56 is prevented from moving relative to the base 18 such that the tines will be drawn off the spacer bar 62. Consequently, even when the stripper assembly 44 is in the rearwardlymost position, the tines are constrained by the spacer bar 62 to remain in proper alignment. Further, the spacer bar 62 is located right behind the band guideway 30. Thus, the properly placed tines are assured of passing the continuous band 12 in the finger guideways 32 on the upper side of the band 12 for the upper tines 46 and on the lower side of the band 12 for the lower tines 50 when the stripper assembly 44 is driven forward.

The carriage block 56 is designed to move forward in the channels 58 from its rearwardlymost position to force the stripper assembly 44 including the tines 46 and 50 through the finger guideways 32. The tines 46 and 50, pass on either side of the carriage band 12 to engage a first end of the marker sleeves 16 which are held in the finger guideways 32 on the carrier fingers 14. The close proximity of the spacer bar 62 to the carrier band 12 insures that the tines 46 and 50 will pass on the upper and lower sides respectively of the band 12 during a forward stroke of the carriage block 56. Once having passed over the continuous band 12, the tines 56 and 60 are constrained by the finger guideways 32, the cover plate 34 and the carrier finger 14 to follow a proper course through the finger guideways, see FIG. 10.

The proper positioning of the tines 46 and 50 is of importance because of the natural tendency of such long, thin members to simply move around obstacles such as the marker sleeves 16. Consequently, the height of the finger guideways 32 between the bottom of the finger guideways 32 and the cover plate 34 is preferably kept to a minimum so that the tines 46 and 50 will not slip over or under the marker sleeves 16 as the stripper assembly 44 moves forward relative to the base 18. At the same time, some space must be provided for the passage of the tines 46 and 50 through the finger guideways 32 on either side of the carrier fingers 14 so that the tines 46 and 50 and the marker sleeves 16 will not be bound in the finger guideways 32. It has been found that a nominal dimension for the depth of the finger guideways 32 which is 0.12 centimeters (0.05 in.) wider than the combined nominal thickness of the fingers 14 and the upper tines 46 and lower tines 50 allows sufficient space for unrestricted passage of the marker sleeves 16 and the tines 46 and 50 without allowing the tines 46 and 50 to move over or under the marker sleeves 16.

The marker sleeves 16 are tightly and slidably held on the carrier fingers 14 in the finger guideways 32. When the tines 46 and 50 are forced by the carriage block 56 through the finger guideways 32, the ends of the tines 46 and 50 force the marker sleeves 16 through the finger guideways 32 off of the carrier fingers 14. As discussed above, the carrier band 12 and consequently the carrier fingers 14 are held by the forward side of the band guideway 30. As a result, the carrier fingers 14 are left behind in the finger guideways 32 as the marker sleeves 16 are forced from the guideway plate 28.

At the forward end of the guideway plate 28, the marker sleeves 16 are allowed to exit when forced from behind by the tines 46 and 50. The exiting marker sleeves 16 remain non-cylindrical, their relaxed configuration. In order that wire-like members may be easily positioned through the marker sleeves 16, it is beneficial that the sleeves be forced into a substantially cylindrical configuration. A die 68 is positioned in front of the guideway plate 28 to receive the exiting non-cylindrical marking sleeves 16. The marker sleeves 16, driven by the tines 46 and 50 are forced by the die 68 into the requisite substantially cylindrical configuration. Thus, the continuous motion of the stripper assembly 44 causes simultaneously the stripping of the marker sleeves 16 from the fingers 14 and the distortion of the marker sleeves 16 into a substantially cylindrical configuration in the die 68.

Figure 14:
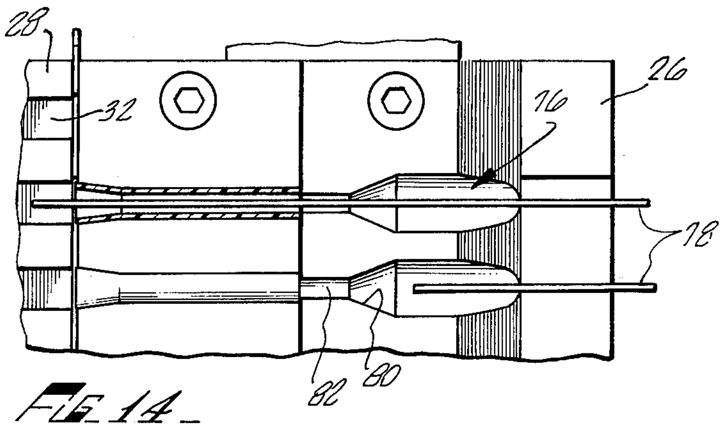
FIG. 14 is a detailed plan view of prepared sleeves showing a first sleeve in cross-section and wire-like members being positioned therethrough.

The die 68, as best seen in detail FIGS. 12, 13 and 14, is formed to receive the sleeves 16 in their relaxed, non-cylindrical configuration and smoothly transform the sleeves 16 into a substantially cylindrical configuration for receipt of wire-like members. The die 68 includes a plurality of channels 17 equal in number to the number of upper or lower tines 46 and 50. In the present embodiment, ten such channels 70 are employed in the die 68. The die 68 is bolted directly to the base 18 in order that it will be fixed relative to the guideway plate 28. This insures proper alignment of the finger guideways 32 and the channels 70.

The die 68 may be considered to incorporate two zones, a transition zone and a holding zone. The transition zone transforms the non-cylindrical sleeves into substantially cylindrical sleeve configurations. The transition zone incorporates two small channels 72 located on the sidewalls of the channels 70. The small channels 72 are of sufficient size to accommodate the minor dimension of the flattened sleeves 16. Further, at the first, input side of the die 68, the small channels 72 are spaced to insure that the full width of the flattened sleeves 16 will be received. The small channels 72 then converge from the first spaced relationship at the first side of the die as they move into the body of the die. It has been found that the small channel 72 may converge at an angle from 10° to 15° relative to the centerline of the main channel 70 without causing a buckling of the incoming marker sleeves 16. The converging nature of the small channels 72 forces the extreme edges of the non-cylindrical sleeves 16 toward one another. This in turn forces the relatively flat upper and lower surfaces of the non-cylindrical sleeves 16 to become substantially cylindrical as seen in FIG. 13.

The second, holding zone of the die 68, follows immediately from the transition zone and extends across the major portion of the die 68. In the holding zone, the channels 70 incorporate small channels 74 similar to small channels 72 found in the transition zone. However, these channels 74 are uniformly spaced along the length of the main channels 70. The small channels 74 act to insure that the incoming marker sleeves 16 will remain in the main channels 70. The small channels 74 take advantage of the natural resistance of the marker sleeves 16 to form a true cylindrical shape.

In the present embodiment, considering sleeves 16 having an inside dimension of 0.238 centimeters (0.094 in.) when forced into a true cylindrical configuration, the depth of the main channels 70 is 0.373 centimeters (0.147 in.) and the width is 0.269 centimeters (0.106 in). The small channels 74 form segments of a cylinder having a radius of 0.119 centimeters (0.047 in.). The center of curvature of the small channels 74 is located 0.107 centimeters (0.042 in) from the sidewalls and 0.163 centimeters (0.068 in.) from the upper surface of the die. Naturally, somewhat larger dimensions would be required corresponding to larger sleeves.

At the opposite side of the die 68 from the transition zone, a series of guide cones 76 are provided for guiding wire-like members 78 into the sleeves 16 now held in substantially cylindrical configuration. The guide cones 76 include conical passageways 80 and cylindrical passageways 82. Both the conical passageways 80 and the cylindrical passageways 82 are open on the top side. The cylindrical passageways 82 are smaller than the channels 70 with which they are aligned in order that the entering wire-like member will be centrally positioned so as not to come into interference with marker sleeves 16. Further, the smaller cylindrical passageways 82 prevent the marker sleeves 16 from being forced too far through the die 68. However, it is intended that the stroke of the carriage block 56 will not force the marker sleeves 16 against the guide cones 76.

Once the wire-like members 78 are positioned through the appropriate marker sleeves 16, the assemblies of wire-like members 78 and marker sleeves 16 may be simply lifted vertically from the die 68. The marker sleeves 16 may then be run along the wire-like members 78 to their most convenient positions.

A knife 84 is slidably mounted on the installation apparatus. The knife 84 is positioned to move between the guideway plate 28 and the die 68. Such movement results in the cutting of the sleeves 16 extending from the finger guideways 32 to the die 68. As can be seen in FIG. 7, the knife 84 if pivotally mounted about pin 86. A stop 88 prevents the knife 84 from rotating clockwise as seen in FIG. 7 beyond the appropriate cutting position. However, the knife is allowed to swing in the counterclockwise direction to the return stop 90 as can best be seen in phantom in FIG. 7. A spring 92 forces the knife 84 back into position once it has drawn back to its rest position. Because the knife 84 may sever the portion of the sleeve 16 remaining in the finger guideways 32 without damaging these remaining portions, these remaining portions of the sleeves 16 may be fed into the die 68 to form sleeves for subsequent wire-like members once the first series of sleeves have been removed. In this way, a number of sleeves may be taken from each individual carrier, finger 14, with a savings in cost and time.

The operative system for the present invention as disclosed in the preferred embodiment is primarily pneumatic. However, the present invention lends itself to hydraulic, electrical and mechanical control. Associated with the cover plate 34 is a control arm 94, this arm is biased by a spring 96 which is fixed to the arm 94 at one end to the base 18 at the other. This biasing returns the cover plate 34 in the up position. When the cover plate 34 is brought down to close over the guideway plate 28 to hold a loaded carrier belt 10, the adjustable actuator screw 98 encounters a four-way valve 100 which is hooked to a pneumatic air supply through hose 102. The valve 100 is biased to supply pressure to hose 104 which is directed to a first side of an air cylinder 106. The air cylinder 106 is mechanically linked to the thrust block 60 and when pressurized by hose 104 draws the thrust block 60 away from the guideway plate area; this in turn forces the tines 46 and 50 away from any engagement with the marker sleeves 16. When the actuating screw 98 encounters the valve 100, the pressure in hose 104 is allowed to vent and hose 108 is pressurized.

Hose 108 extends to a second four-way valve 110 controlled by a roller switch mechanism 112. When the roller switch mechanism 112 is in its relaxed position, the incoming pressurized air through hose 108 is directed to the shuttle valve 122 and from there through hose 124 which extends to the back side of the air cylinder 106 which drives the thrust block 60 and consequently the stripper assembly 44 to operate on the marker sleeves 16. This driving motion is limited by the engagement of the roller switch mechanism 112 by stop 120. When stop 120 actuates the roller switch mechanism 112, the thrust block 60 is not driven through its entire stroke. Instead shuttle valve 122 is de-pressurized and T-coupling 114 is pressurized.

With T-coupling 114 pressurized, the main air cylinder 106 ceases to drive the thrust block 60. Instead, hoses 116 and 118 are pressurized. Hose 118 is directed to valve 128 located at the end of an air cylinder 130 associated with the knife 84. Thus, the knife 84 cannot be activated until the thrust block 60 has driven the first portion of the sleeves 16 into the die 68. The air cylinder 130 may be activated by control button 132 to cut the extended sleeves 16. The air cylinder 130 is spring loaded and the knife 84 returns automatically upon release of the control 132.

With T-coupling 114 pressurized, hose 116 delivers pressure to valve 134. With the first set of sleeves cut, assembled with wire-like members and removed, valve 134 may be activated to allow the pressure in hose 116 to pass through hose 126, shuttle valve 122 and hose 124 to the back side of the air cylinder 106. Thus, valve 134 overrides the roller switch mechanism 112 and forces the stripper assembly 44 to move to its maximum stroke. Thus, the remaining sleeve portion is thrust into the die 68. The cover plate 34 may then be lifted. This causes the valve 100 to again pressurize hose 104 which then causes the return of the air cylinder 106 along with the stripper assembly 44.

Thus, an apparatus is disclosed which is capable of simultaneously stripping a plurality of non-cylindrical marker sleeves 16 from carrier fingers 14 and distorting the non-cylindrical marking sleeves 16 to a substantially cylindrical configuration. In this way, non-cylindrical marking sleeves may be easily assembled with wire-like members. While embodiments and applications of this invention have been shown and described, it would be apparent to those skilled in the art that many more modifications are possible without departing from the inventive concepts herein described. The invention, therefore, is not to be restricted except by the spirit of the appended claims.

What is claimed is:

1. An apparatus for the facile installation of non-cylindrical sleeves on wire-like members, the sleeves being tightly and slidably arranged on non-cylindrical fingers extending from a carrier belt, the apparatus comprising a base including a guideway for receiving the carrier belt and finger guideways for receiving fingers of the carrier belt with the sleeves arranged thereon;

stripper means for slidably forcing sleeves from the carrier belt fingers, said stripper means being slidably mounted on said base and including tines positioned to slide along each side of the carrier belt fingers in said finger guideways; and a die fixed to said base and positioned to receive sleeves as they are stripped from the fingers, said die including a plurality of die passageways having sidewalls that narrow from a first width that accommodates the non-cylindrical sleeve dimension to a smaller second width to force the sleeves into a substantially cyclindrical configuration when the sleeves are pressed into the die passageways by the stripper means.

2. The apparatus of claim 1 wherein said base further includes a cover plate capable of enclosing said first guideway and said finger guideways.

3. The apparatus of claim 1 wherein said stripper means includes a row of upper tines and a row of lower tines, said upper and said lower tines being mutually parallel and having an upper tine directly above each lower tine.

4. The apparatus of claim 1 wherein said die includes a plurality of channels aligned with said finger guideways, said channels each including a tapered transition zone.

5. The apparatus of claim 4 wherein said channels include small channels located in the sidewalls of said channels.

6. The apparatus of claim 4 wherein said transition zone includes a small channel located in each sidewall of each said channel, said small channels converging at an angle of from 10° to 15° with the centerline of said channels.

7. The apparatus of claim 1 further including a knife slidably mounted to said base to pass between said finger guideways and said die to cut the sleeves.

8. The apparatus of claim 1 wherein said stripper means may be controlled to provide two stroke lengths for sliding said tines along either side of the carrier belt fingers.

* * * * *

UNITED STATES PATENT AND TRADEMARK OFFICE

CERTIFICATE OF CORRECTION

PATENT NO. : 4,034,450

DATED : July 12, 1977

INVENTOR(S) : William Carlomagno & Stephen Diaz

It is certified that error appears in the above-identified patent and that said Letters Patent are hereby corrected as shown below:

At Column 10, line 25, delete "centerline" and insert therefor -- centerlines --.

Signed and Sealed this

*Twenty-seventh* Day of *September 1977*

[SEAL]

*Attest:*

RUTH C. MASON
*Attesting Officer*

LUTRELLE F. PARKER
*Acting Commissioner of Patents and Trademarks*